Feb. 16, 1971    J. W. RIDDEL    3,563,091

FLOAT-OPERATED THERMISTOR TANK LEVEL SENDER

Filed Aug. 4, 1969    2 Sheets-Sheet 1

INVENTOR.
John W. Riddel
BY
Paul Fitzpatrick
ATTORNEY

United States Patent Office 3,563,091
Patented Feb. 16, 1971

3,563,091
FLOAT-OPERATED THERMISTOR
TANK LEVEL SENDER
John W. Riddel, Fenton, Mich., assignor to General Motors Corporation, Detroit, Mich., a corporation of Delaware
Filed Aug. 4, 1969, Ser. No. 847,180
Int. Cl. G01f 23/10
U.S. Cl. 73—295    14 Claims

ABSTRACT OF THE DISCLOSURE

A liquid level indicator having a float positioned in a liquid reservoir, a pair of thermistors secured to the float by a pair of heat transfer members positioned on the float so as to be movable therewith and variably immersed in the liquid for supporting the thermistors and for conveying heat from the thermistors to the liquid so as to vary the temperatures and the resistances of the thermistors, and an indicating device responsive to the respective thermistor resistances so as to provide an indication of the quantity of liquid in the reservoir.

---

This invention relates to improvements in liquid level indicators.

Liquid level indicators of several types are in common use. These indicators may be classified generally as either direct reading, which directly indicate liquid level at the location of a liquid reservoir, and as remote, which provide for a sender unit positioned at the location of a liquid reservoir and a receiver unit which is positioned at a remote location and is responsive to a signal provided by the sender unit so as to indicate the liquid level in the reservoir. A typical application for remote liquid level indicators is their well-known use in monitoring a liquid level in a vehicle. In an environment such as this, the sender unit may, for example, be positioned adjacent a fuel tank for monitoring the level of fuel therein and the receiver unit would normally include a meter positioned at a remote location, such as in the vehicle dashboard. The subject liquid level indicator is of the remote indicating type and it will be described with reference to its use in monitoring the level of fuel in a fuel tank, though it is obvious to those versed in the art that it may also be employed to monitor liquid levels in various other environments.

Liquid level indicators used in the past to monitor the level of fuel in a fuel reservoir, have commonly employed two types of senders. The first is the well-known float operated sender which provides for mechanically varying a resistor in accordance with the position of a float in a fuel reservoir. Because of their nature of operation, these systems are subject to wear caused by the physical motion between the resistor and the float, which wear may result in breakage of the sender so as to render the liquid level indicator inoperative.

A more recent type of liquid level indicator employs a thermistor positioned in a liquid reservoir so as to be variably immersed in the liquid in accordance with the liquid level. Sender units which employ thermistors such as this, have no moving parts and therefore have a theoretical life span in excess of those units which employ mechanically variable resistors. However, these thermistor senders usually employ thermistors which extend from the upper to the lower regions of the liquid reservoir, which necessitates an expensive thermistor having a large consumption of power. The power consumption of thermistor operated liquid level senders is further increased when they are provided with an electric heater to increase their thermal response.

It, therefore, is an object of this invention to provide a new and different liquid level indicator incorporating a sender unit that includes a thermistor and a heat transfer member maneuverable in accordance with liquid level so as to vary the temperature and the resistance of the thermistor in accordance with the liquid level.

A more specific object of this invention is to provide a liquid level indicator which utilizes a float assembly and a thermistor attached to the float assembly by a heat transfer member that is variably immersed in the liquid in accordance to the liquid level so as to vary the thermistor temperature and resistance in accordance with the liquid level.

A still more specific object of this invention is to provide a liquid level indicator utilizing a float-operated sending unit that includes a pair of thermistors secured to the float assembly by a pair of heat transfer members that are variably immersed in the liquid so as to increase the heat transfer to the liquid from one of the thermistors while decreasing the heat transfer to the liquid from the other thermistor, thereby oppositely varying the thermistor resistances.

The foregoing and other objects and advantages of this invention will become apparent from the following description and from the accompanying drawings, in which.

Figure 1:
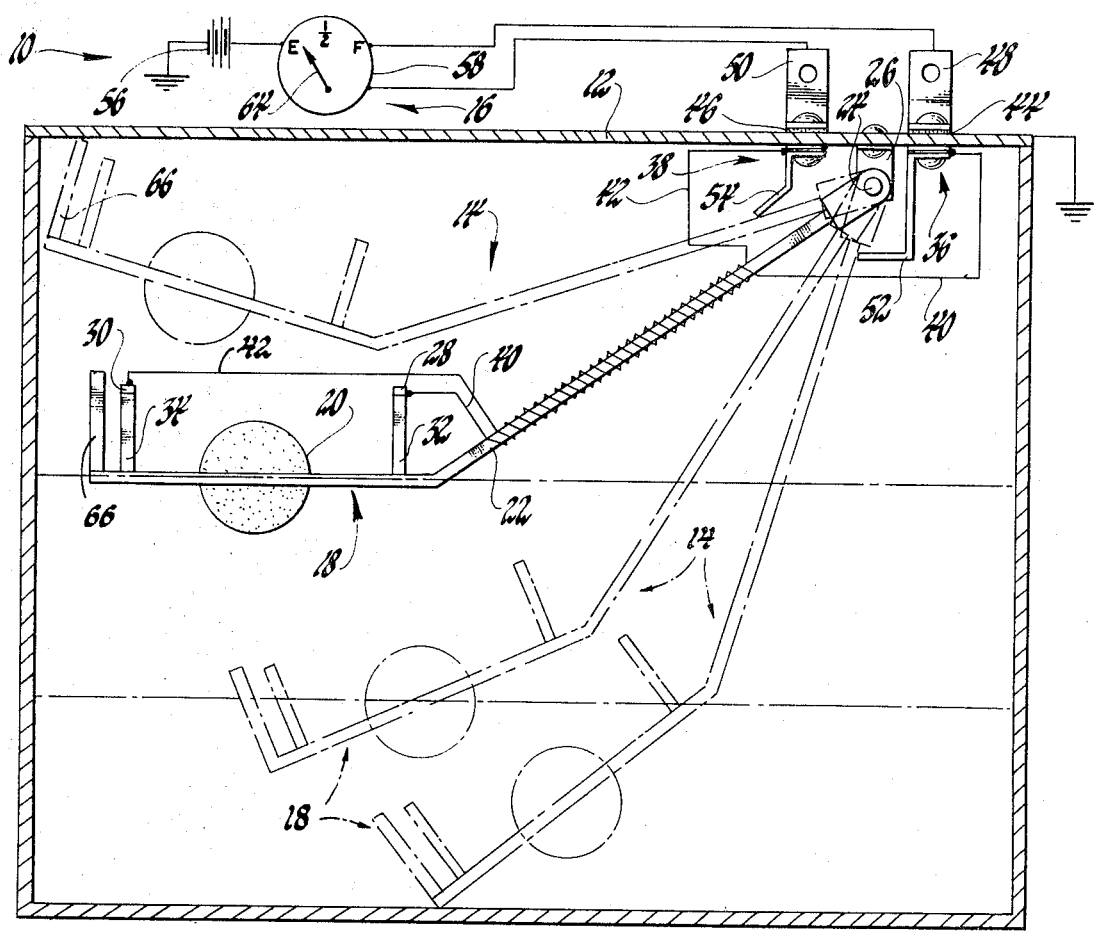
FIG. 1 illustrates schematically a liquid level indicator incorporating the principles of the invention.

As is shown in FIG. 1, a liquid level indicator 10 is provided which utilizes a liquid reservoir 12, a sending unit 14 positioned in the reservoir 12 for sensing the liquid level in the reservoir 12 and for providing an indication of the liquid level, and an indicating receiver unit in the form of a meter circuit 16 for sensing the indication of the liquid level provided by the sender unit 14 and for indicating the sensed liquid level to an observer.

The sending unit 14 is comprised of a float assembly 18 that includes a float 20 and a float arm 22 electrically connected to the reservoir 12 through a pivotal mounting 24 and a grounded terminal 26, first and second thermistors 28 and 30 for sensing the liquid level in the reservoir 12, first and second heat transfer members 32 and 34 for transferring heat from the thermistors 28 and 30 to the liquid in the reservoir 12 and for supporting the thermistors 28 and 30 by securing them to the float 20 so as to be movable therewith, and first and second terminals 36 and 38 electrically connected to the respective thermistors 28 and 30 through a pair of leads 40 and 42. The terminals 36 and 38 are electrically insulated from the reservoir 12 as by a pair of grommets 44 and 46, and include external contacts 48 and 50 for electrical connection of the sending unit 14 to the meter circuit 16. For reasons which will later become apparent, the terminals 36 and 38 are provided with depending contacts 52 and 54, which combine with the float arm 22 to form switches that connect the terminals 36 and 38 to ground through the grounded terminal 26 when the float assembly 18 is at its lowermost and uppermost positions, respectively.

While many diverse substances may be employed in the heat transfer members 32 and 34, they have been found to operate quite satisfactory when made of an alloy comprising 54% iron, 24% nickel, and 18% cobalt or an alloy comprising various amounts of iron, nickel, manganese, and silicon.

Figure 2:
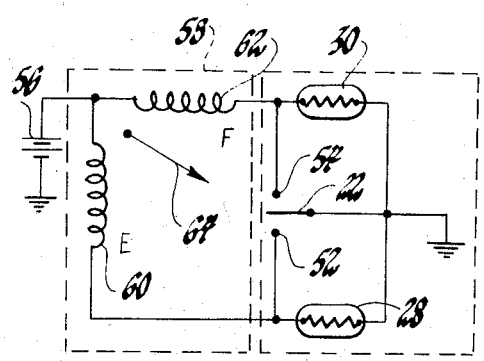
FIG. 2 is a schematic diagram of the circuitry employed in FIG. 1.
Figure 3:
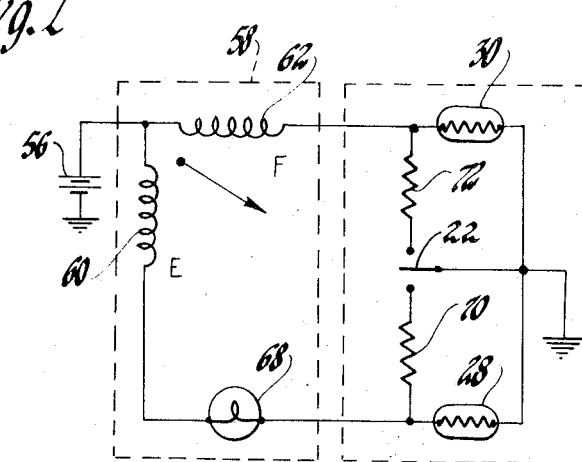
FIG. 3 is a modification of the FIG. 2 circuitry.

The meter circuit 16 includes a power source, such as a battery 56, which serves to both power the meter circuit 16 and as a means for internally heating the thermistors 28 and 30 and a meter 58 which is responsive to current through the thermistors 28 and 30. In the illustrated embodiment, the battery 56 may be a conventional vehicle battery and the meter 58 may be the well-known vehicle fuel gauge. As is seen in FIGS. 2 and 3, the meter 58 includes first and second windings 60 and 62 wound so as to produce variable magnetic fields at a predetermined angle, such as 90°, to each other when energized and an indicator needle 64 responsive to the magnetic fields for indicating to an observer the liquid level in the reservoir 12.

Thet operation of the liquid level indicator 10 will now be explained. As is seen in FIG. 1, the float assembly 18 varies in position in accordance with the liquid level due to the float 20 buoyancy. Due to the angular configuration of the float arm 22 the immersion of the heat transfer members 32 and 34 in the liquid also varies in accordance with the liquid level. For example, referring to the uppermost position of the float assembly 18, shown in phantom lines, in which an end portion 66 of the float arm 22 is contacting the upper surface of the reservoir 12, the second heat transfer member 34 is completely above the level of the liquid and the first heat transfer member 32 is considerably immersed in the liquid. For illustrative purposes the various liquid levels corresponding to the various illustrated positions of the float assembly 18 are portrayed in phantom lines as crossing the geometric center of the float 20 though persons skilled in the art will appreciate that in practice a greater or lesser portion of the float assembly 18 will be immersed in the liquid depending on the float assembly 18 construction. It will also be appreciated that the uppermost and lowermost liquid levels in the reservoir 12 will not affect the float assembly 18 position as the float assembly 18 motion is arrested by the reservoir 12 prior to these extreme liquid levels being reached.

When the float assembly 18 is in its uppermost position and the liquid level crosses the geometric center of the float 20 the first thermistor 28 is cooled considerably by heat conduction through the first heat transfer member 32 to the liquid. The second thermistor 30 is not cooled at this time, however, due to the second heat transfer member 34 being out of contact with the liquid. In the illustrated embodiment the thermistors 28 and 30 are of a type having a negative temperature coefficient. That is, their electrical resistance is increased with a decrease of temperature and is decreased with an increase of temperature. Accordingly, the first thermistor 28 assumes a relatively high resistance and the second thermistor 30 assumes a relatively low resistance when the float assembly 18 is in its uppermost position. As is seen in FIG. 2, when the first thermistor 28 assumes a high resistance and the second thermistor 30 assumes a low resistance the second winding 62 has a very high current therethrough and the first winding 60 has a very low current therethrough. In addition, since the float arm 22 is touching the depending contact 54, the thermistor 30 is effectively short circuited so as to provide an increased current through the second winding 62, causing the meter 58 to indicate the reservoir 12 is full.

As the liquid level in the reservoir 12 decreases, the float arm 22 is separated from the depending contact 54 so as to discontinue the bypassing of the second thermistor 30. However, due to the second thermistor 30 being at a very low resistance the current through the second winding 62 continues at a very high level. As the float assembly 18 falls to the position shown in solid lines, the immersion of the first heat transfer member 32 in the liquid decreases so as to lessen the heat transfer from the first thermistor 28 to the liquid, thereby increasing the temperature and decreasing the resistance of the first thermistor 28.

When the float assembly 18 is at the position shown in solid lines, the reservoir 12 is half full and neither of the heat transfer members 32 and 34 are immersed in the liquid. Both of the thermistors 28 and 30 are thus at a maximum temperature and their resistances are equal. The currents through the windings 60 and 62 are also equal, causing the indicator needle 64 to indicate that the reservoir 12 is half full.

As the liquid level in the reservoir 12 continues to decrease, the first heat transfer member 32 remains above the level of the liquid but the second heat transfer member 34 becomes immersed in the liquid, reducing the temperature of the second thermistor 30 and increasing its resistance. This causes a corresponding decrease in current through the second winding 62 while a large current passes through the first winding 60 due to the low resistance of the first thermistor 28. The indicator needle 64 indicates the lowering liquid level by aligning itself more closely with the magnetic field produced by the first winding 60.

The float assembly 18 continues to indicate the level of the liquid in the reservoir 12 until the float arm 22 contacts the bottom of the reservoir 12. When the float arm 22 contacts the reservoir 12 bottom it also touches the depending contact 52 so as to short the thermistor 28. Current through the first winding 60 is thus at a maximum and remains so as the reservoir 12 is emptied.

Due to the windings 60 and 62 being energized in opposition the only time that the currents through the windings 60 and 62 are to be equal is when the resistances of the thermistors 28 and 30 are equal. It is desirable that this condition exist only when the reservoir 12 is half full of liquid. However, as persons skilled in the art will appreciate, the resistances of the thermistors 28 and 30 will also be equal when the reservoir is either full or empty of liquid. That is, when the reservoir is filled, both of the thermistors 28 and 30 and the heat transfer members 32 and 34 are immersed in the liquid, causing the resistances of the thermistors 28 and 30 to both be at a maximum. The meter 58 would thus erroneously indicate that the reservoir 12 was half full because of the equal resistances of the thermistors 28 and 30 if it were not for the depending contact 54 being grounded by the float arm 22 so as to provide a current unbalance through the windings 60 and 62. Similarly, when the reservoir is empty both of the thermistors 28 and 30 and the heat transfer members 32 and 34 are completely removed from the liquid and the meter 58 would erroneously indicate that the reservoir 12 is half full if it were not for the depending contact 52 being grounded through the float arm 22 so as to provide a current unbalance through the windings 60 and 62.

As is shown in FIG. 3, a lamp 68 may be provided in series with the first winding 60 and a pair of resistors 70 and 72 may be provided in parallel with the respective thermistors 28 and 30. The operation of the modification shown in FIG. 3 is substantially similar to that previously described but further provides for illuminating the lamp 68 as the liquid level in the reservoir 12 decreases and current through the first winding 60 increases. The lamp 68 thus provides an additional visual indication that the reservoir 12 is nearly empty of liquid and serves to affirmatively attract the attention of an observer. The resistors 70 and 72 are provided to protect the windings 60 and 62 from excessive currents when the contacts 52 and 54 are connected to ground by the float arm 22.

Figure 4:
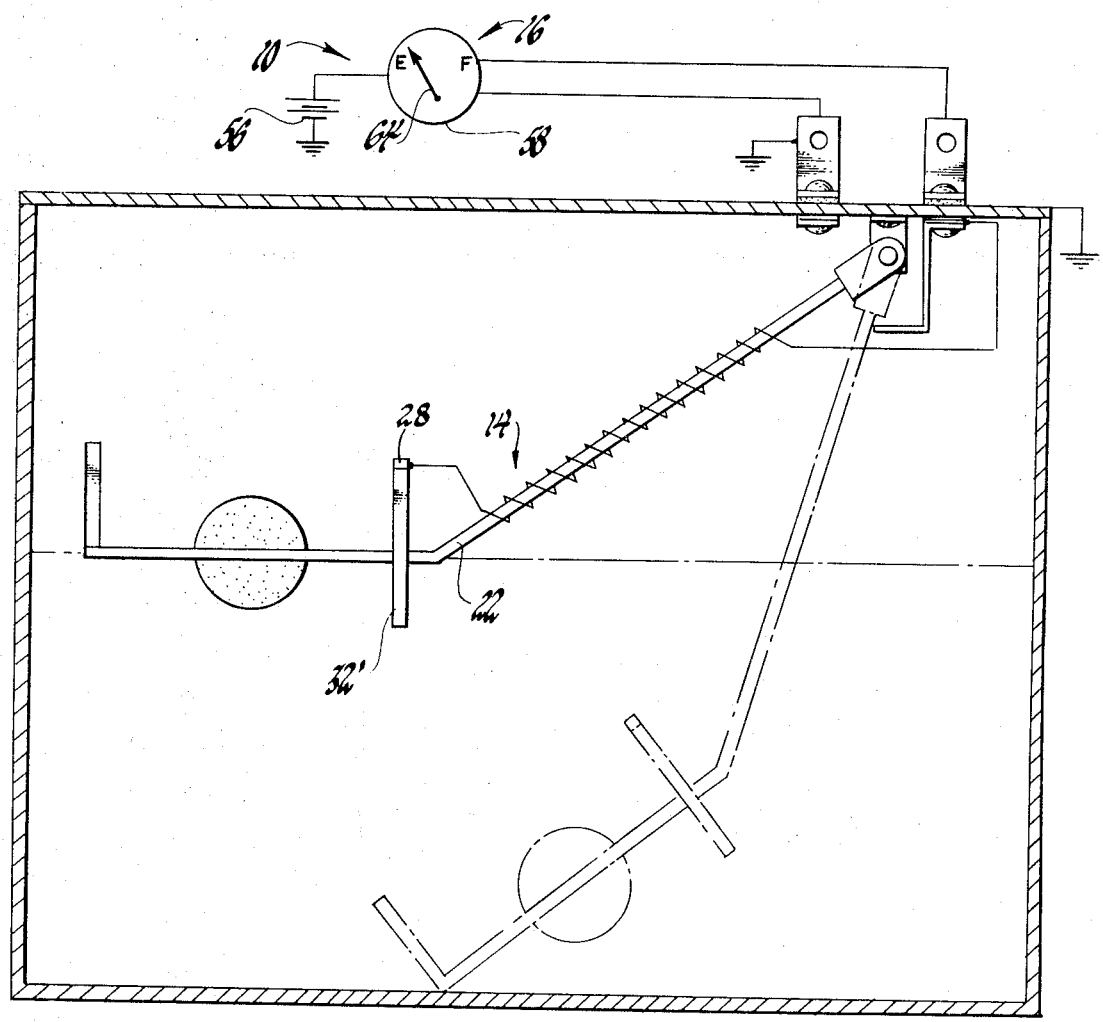
FIG. 4 is a modification of the FIG. 1 indicator.

Persons versed in the art will also appreciate that the sending unit 14 may be modified to function effectively by using a single thermistor supported by a single heat transfer member. As is shown in FIG. 4, the first heat transfer member 32′ may be doubled in length and operated in conjunction with the first thermistor 28 to serve this purpose. The first heat transfer member 32′ thus provides a variable dissipation of heat from the first thermistor 28 through a range of liquid levels substantially equal to that sensed by the embodiment previously discussed, heat transfer from the first heat transfer member 32′ to the float arm 22 being negligible due to the reduced cross section therebetween. The first thermistor 28 resistance in this modification is sensed by the meter 58 by grounding the depending contact 54 so as to continuously energize the second winding 62. While the range of the indicator needle 64 is reduced its position is nevertheless proportional to the liquid level in this reservoir. For example, when the first thermistor 28 is completely immersed in the liquid it would have a high resistance and the indicator needle 64 would be aligned substantially with the second winding 62. However, when the first thermistor 28 and the first heat transfer member 32' are above the liquid level the first thermistor 28 would assume a very low resistance and the currents through the windings 60 and 62 would be approximately equal, causing the indicator needle 64 to be under the equal influence of the windings 60 and 62. Of course, indicating means other than the meter circuit 16 may also be used to sense the first thermistor 28 resistance.

The embodiment shown in FIG. 1 may also be modified by enlarging both of the heat transfer members 32 and 34 in the fashion illustrated in FIG. 4 so as to vary the heat transfer from both of the thermistors 28 and 30 over an increased range.

Figure 5:
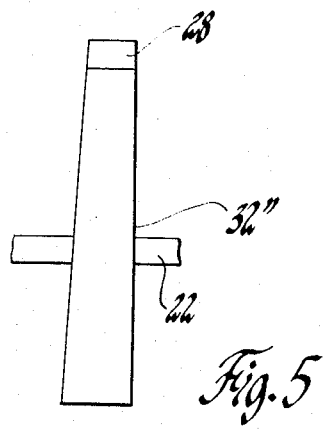
FIG. 5 is a modified FIG. 1 heat transfer member.

In yet another modification of the embodiment shown in FIG. 1 the transfer of heat from the thermistors may be made a function of the reservoir 12 configuration. That is, the heat transfer members 32 and 34 may be provided with a predetermined tapering cross section, as shown in FIG. 5, so as to transfer heat from the thermistors 28 and 30 to the liquid in a fashion that is a nonlinear function of the liquid level, thus compensating for irregularities in the reservoir 12 configuration.

In addition to the foregoing, many other modifications in this invention will be apparent to those skilled in the art.

What is claimed is:

1. In a liquid level indicator, the combination of a reservoir for liquid, a float positioned in the reservoir and following the level of the liquid in the reservoir, a thermistor, means for heating the thermistor, a heat transfer member secured to the float so as to be movable therewith and variably immersed in the liquid in accordance with the liquid level in the reservoir for supporting the thermistor and for conveying heat from the thermistor to the liquid in accordance with the immersion in the liquid of the heat transfer member, thereby varying the temperature and the resistance of the thermistor in accordance with the liquid level in the reservoir, and indicating means responsive to the resistance variation of the thermistor so as to provide an indication of the liquid level in the reservoir.

2. In a liquid level indicator, the combination of a reservoir for liquid, a float positioned in the reservoir and following the level of the liquid in the reservoir, first and second thermistors, means for heating the thermistors, first and second heat transfer members secured to the float so as to be movable therewith and alternately and variably immersed in the liquid in accordance with the liquid level in the reservoir for supporting the respective first and second thermistors and for conveying heat from the thermistors to the liquid in accordance with the immersion in the liquid of the respective heat transfer members, thereby varying the temperatures and the resistances of the respective thermistors in accordance with the liquid level in the reservoir, and indicating means responsive to the resistance variations of the respective thermistors so as to provide an indication of the liquid level in the reservoir.

3. The apparatus of claim 2 in which the indicating means includes first and second windings energizable so as to produce first and second variable magnetic fields in accordance with the resistances of the respective first and second thermistors.

4. In a liquid level indicator, the combination of a reservoir for liquid, a float positioned in the reservoir, a pivotally mounted angular float arm for supporting the float so as to rotate the float relative to the pivotal mounting, first and second thermistors, means for heating the thermistors, first and second heat transfer members secured to the float so as to be movable therewith and variably immersed in the liquid in accordance with the liquid level in the reservoir for supporting the respective first and second thermistors and for conveying heat from the thermistors to the liquid in accordance with the immersion in the liquid of the respective heat transfer members, thereby varying the temperatures and resistances of the respective thermistors in accordance with the liquid level in the reservoir, the heat transfer members being positioned at different distances from the pivotal mountings so as to increase the immersion of the first heat transfer member and decrease the immersion of the second heat transfer member due to rotation of the float relative to the pivotal mountings as the liquid level in the reservoir is raised and to decrease the immersion of the first heat transfer member and increase the immersion of the second heat transfer member due to rotation of the float relative to the pivotal mounting as the liquid level in the reservoir is lowered, and indicating means responsive to the resistance variations of the thermistors so as to provide an indication of the liquid level in the reservoir.

5. The apparatus of claim 4 in which the indicating means includes first and second windings energizable so as to produce first and second variable magnetic fields in accordance with the resistances of the respective first and second thermistors.

6. In a liquid level indicator, the combination of a reservoir for liquid, a float positioned in the reservoir, a pivotally mounted angular float arm for supporting the float so as to rotate the float relative to the pivotal mounting, first and second thermistors, means for heating the thermistors, first and second elongated heat transfer members secured to the float so as to be in a substantially upright position and variably immersed in the liquid in accordance with the liquid level in the reservoir for supporting the respective first and second thermistors and for conveying heat from the thermistors to the liquid in accordance with the immersion in the liquid of the respective heat transfer members, thereby varying the temperatures and resistances of the respective thermistors in accordance with the liquid level in the reservoir, the heat transfer members being positioned at different distances from the pivotal mounting so as to increase the immersion of the first heat transfer member and decrease the immersion of the second heat transfer member due to rotation of the float relative to the pivotal mounting as the liquid level in the reservoir is raised and to decrease the immersion of the first heat transfer member and increase the immersion of the second heat transfer member due to rotation of the float relative to the pivotal mounting as the liquid level in the reservoir is lowered, and indicating means responsive to the resistance variations of the thermistors so as to provide an indication of the liquid level in the reservoir.

7. The apparatus of claim 6 in which the indicating means includes first and second windings energizable so as to produce first and second variable magnetic fields in accordance with the resistances of the respective first and second thermistors.

8. In a liquid level indicator, the combination of a reservoir for liquid, a float positioned in the reservoir and following the level of the liquid in the reservoir, first and second thermistors, means for heating the thermistors, first and second heat transfer members secured to the float so as to be movable therewith and alternately and variably immersed in the liquid in accordance with the liquid level in the reservoir for supporting the respective first and second thermistors and for conveying heat from the thermistors to the liquid in accordance with the immersion in the liquid of the respective heat transfer members, thereby varying the temperatures and the resistances of the respective thermistors in accordance with the liquid level in the reservoir, a low level switch responsive to the float position so as to be operative when the float is in a low position, a high level switch responsive to the float position so as to be operative when the float is in a high position, and indicating means responsive to the resistance variations of the thermistors and to the operativeness of the switches so as to provide an indication of the liquid level in the reservoir.

9. The apparatus of claim 8 in which the indicating means includes first and second windings energizable so as to produce first and second variable magnetic fields in accordance with the resistances of the respective first and second thermistors.

10. In a liquid level indicator, the combination of a reservoir for liquid, a float positioned in the reservoir, a pivotally mounted angular float arm for supporting the float so as to rotate the float relative to the pivotal mounting, first and second thermistors, means for heating the thermistors, first and second heat transfer members secured to the float so as to be movable therewith and variably immersed in the liquid in accordance with the liquid level in the reservoir for supporting the respective first and second thermistors and for conveying heat from the thermistors to the liquid in accordance with the immersion in the liquid of the respective heat transfer members, thereby varying the temperatures and resistances of the respective thermistors in accordance with the liquid level in the reservoir, the heat transfer members being positioned at different distances from the pivotal mounting so as to increase the immersion of the first heat transfer member and decrease the immersion of the second heat transfer member due to rotation of the float relative to the pivotal mounting as the liquid level in the reservoir is raised and to decrease the immersion of the first heat transfer member to increase the immersion of the second heat transfer member due to rotation of the float relative to the pivotal mounting as the liquid level in the reservoir is lowered, a low level switch responsive to the float position so as to be operative when the float is in a low position, a high level switch responsive to the float position so as to be operative when the float is in a high position, and indicating means responsive to the resistance variation of the thermistors and to the operativeness of the switches so as to provide an indication of the liquid level in the reservoir.

11. A sending unit for use in a liquid level indicator comprising, in combination, a reservoir for liquid, a float positioned in the reservoir and following the level of the liquid in the reservoir, a thermistor, and a heat transfer member secured to the float so as to be movable therewith and variably immersed in the liquid in accordance with the liquid level in the reservoir for supporting the thermistor and for conveying heat from the thermistor to the liquid in accordance with the immersion in the liquid of the heat transfer member, thereby varying the temperature and the resistance of the thermistor in accordance with the liquid level in the reservoir.

12. The sending unit of claim 11 in combination with indicating means responsive to the thermistor resistance so as to provide an indication of the liquid level in the reservoir.

13. A float assembly for use in monitoring liquid level in a reservoir comprising the combination of a float positioned in the reservoir and following the level of the liquid in the reservoir, a thermistor, and a heat transfer member secured to the float so as to be movable therewith and variably immersed in the liquid in accordance with the liquid level in the reservoir for supporting the thermistor and for conveying heat from the thermistor to the liquid in accordance with the immersion in the liquid of the heat transfer member, thereby varying the temperature and the resistance of the thermistor in accordance with the liquid level in the reservoir.

14. The float assembly of claim 13 in combination with indicating means responsive to the thermistor resistance so as to provide an indication of the liquid level in the reservoir.

References Cited

UNITED STATES PATENTS

| | | | |
|---|---|---|---|
| 1,988,192 | 1/1935 | Drabin | 338—33X |
| 2,456,617 | 12/1948 | Burch | 73—304 |
| 2,669,123 | 2/1954 | Ballard | 73—317 |
| 3,289,303 | 12/1966 | Farrell et al. | 73—295X |
| 3,479,875 | 11/1969 | Riddel | 73—295 |

LOUIS R. PRINCE, Primary Examiner

D. M. YASICH, Assistant Examiner

U.S. Cl. X.R.

73—313; 200—84